US012106094B2

(12) United States Patent
Balasubramanian et al.

(10) Patent No.: US 12,106,094 B2
(45) Date of Patent: Oct. 1, 2024

(54) METHODS AND SYSTEMS FOR AUTO CREATION OF SOFTWARE COMPONENT REFERENCE GUIDE FROM MULTIPLE INFORMATION SOURCES

(71) Applicant: Open Weaver Inc., Miami, FL (US)

(72) Inventors: Ashok Balasubramanian, Chennai (IN); Karthikeyan Krishnaswamy Raja, Chennai (IN); Meenakshisundaram Chinnappan, Chennai (IN); Suresh Babu Konduru, Chennai (IN); John Hansel, Chennai (IN)

(73) Assignee: Open Weaver Inc., Miami, FL (US)

( * ) Notice: Subject to any disclaimer, the term of this patent is extended or adjusted under 35 U.S.C. 154(b) by 112 days.

(21) Appl. No.: 17/679,560

(22) Filed: Feb. 24, 2022

(65) Prior Publication Data

US 2022/0269503 A1 Aug. 25, 2022

Related U.S. Application Data

(60) Provisional application No. 63/153,241, filed on Feb. 24, 2021.

(51) Int. Cl.
*G06F 8/73* (2018.01)

(52) U.S. Cl.
CPC .................................... *G06F 8/73* (2013.01)

(58) Field of Classification Search
CPC .................................... G06F 8/73; G06F 8/77
See application file for complete search history.

(56) References Cited

U.S. PATENT DOCUMENTS

| | | | |
|---|---|---|---|
| 5,953,526 | A | 9/1999 | Day et al. |
| 7,322,024 | B2 | 1/2008 | Carlson et al. |

(Continued)

FOREIGN PATENT DOCUMENTS

| | | | |
|---|---|---|---|
| CN | 108052442 A | 5/2018 |
| KR | 10-2020-0062917 | 6/2020 |

(Continued)

OTHER PUBLICATIONS

Iderli Souza, An Analysis of Automated Code Inspection Tools for PHP Available on Github Marketplace, Sep. 2021, pp. 10-17 (Year: 2021).

(Continued)

*Primary Examiner* — Wei Y Zhen
*Assistant Examiner* — Amir Soltanzadeh
(74) *Attorney, Agent, or Firm* — Foley & Lardner LLP

(57) ABSTRACT

Systems and methods for automatically creating a software component reference guide from multiple information sources are disclosed. In one aspect, the method includes receiving, from a user, a request for reference guides for a software components and view corresponding results, identifying the software component, identifying different sources of information for the software component, generating introductory information of the software component, generating technology details of the software component, generating frequently asked questions (FAQs) and their related solutions associated with the software component, training a catalog of natural language terms related to the software components, and providing, based on the trained catalog, the introductory information, technology details, and FAQs to the user.

21 Claims, 10 Drawing Sheets

(56) References Cited

U.S. PATENT DOCUMENTS 7,703,070 B2 4/2010 Bisceglia
7,774,288 B2 8/2010 Acharya et al.
7,958,493 B2 6/2011 Lindsey et al.
8,010,539 B2 8/2011 Blair-Goldensohn et al.
8,051,332 B2 11/2011 Zakonov et al.
8,112,738 B2 2/2012 Pohl et al.
8,112,744 B2 2/2012 Geisinger
8,219,557 B2 7/2012 Grefenstette et al.
8,296,311 B2 10/2012 Rapp et al.
8,412,813 B2 4/2013 Carlson et al.
8,417,713 B1 4/2013 Blair-Goldensohn et al.
8,452,742 B2 5/2013 Hashimoto et al.
8,463,595 B1 6/2013 Rehling et al.
8,498,974 B1 7/2013 Kim et al.
8,627,270 B2 1/2014 Fox et al.
8,677,320 B2 3/2014 Wilson et al.
8,688,676 B2 4/2014 Rush et al.
8,838,606 B1 9/2014 Cormack et al.
8,838,633 B2 9/2014 Dhillon et al.
8,935,192 B1 1/2015 Ventilla et al.
8,943,039 B1 1/2015 Grieselhuber et al.
9,015,730 B1 4/2015 Allen et al.
9,043,753 B2 5/2015 Fox et al.
9,047,283 B1 6/2015 Zhang et al.
9,135,665 B2 9/2015 England et al.
9,176,729 B2 11/2015 Mockus et al.
9,201,931 B2 12/2015 Lightner et al.
9,268,805 B2 2/2016 Crossley et al.
9,330,174 B1 5/2016 Zhang
9,361,294 B2 6/2016 Smith
9,390,268 B1 7/2016 Martini et al.
9,471,559 B2 10/2016 Castelli et al.
9,558,098 B1 1/2017 Alshayeb et al.
9,589,250 B2 3/2017 Palanisamy et al.
9,626,164 B1 4/2017 Fuchs
9,672,554 B2 6/2017 Dumon et al.
9,977,656 B1 5/2018 Mannopantar et al.
10,305,758 B1 5/2019 Bhide et al.
10,474,509 B1 11/2019 Dube et al.
10,484,429 B1 11/2019 Fawcett et al.
10,761,839 B1 9/2020 Migoya et al.
10,922,740 B2 2/2021 Gupta et al.
11,288,167 B2 3/2022 Vaughan
11,294,984 B2 4/2022 Kittur et al.
11,295,375 B1 4/2022 Chitrapura et al.
11,301,631 B1 4/2022 Atallah et al.
11,334,351 B1 5/2022 Pandurangarao et al.
11,461,093 B1 * 10/2022 Edminster ................. G06F 8/60
11,474,817 B2 10/2022 Sousa et al.
11,893,117 B2 2/2024 Segal et al.
2001/0054054 A1 12/2001 Olson
2002/0059204 A1 5/2002 Harris
2002/0150966 A1 10/2002 Muraca
2002/0194578 A1 12/2002 Irie et al.
2004/0243568 A1 12/2004 Wang et al.
2006/0090077 A1 4/2006 Little et al.
2006/0104515 A1 5/2006 King et al.
2006/0200741 A1 9/2006 Demesa et al.
2006/0265232 A1 11/2006 Katariya et al.
2007/0050343 A1 3/2007 Siddaramappa et al.
2007/0185860 A1 8/2007 Lissack
2007/0234291 A1 10/2007 Ronen et al.
2007/0299825 A1 12/2007 Rush et al.
2009/0043612 A1 2/2009 Szela et al.
2009/0319342 A1 12/2009 Shilman et al.
2010/0106705 A1 4/2010 Rush et al.
2010/0121857 A1 5/2010 Elmore et al.
2010/0174670 A1 7/2010 Malik et al.
2010/0205198 A1 8/2010 Mishne et al.
2010/0205663 A1 8/2010 Ward et al.
2010/0262454 A1 10/2010 Sommer et al.
2011/0231817 A1 9/2011 Hadar et al.
2012/0143879 A1 6/2012 Stoitsev
2012/0259882 A1 10/2012 Thakur et al.
2012/0278064 A1 11/2012 Leary et al.
2013/0103662 A1 4/2013 Epstein
2013/0117254 A1 5/2013 Manuel-Devadoss et al.
2013/0326469 A1 12/2013 Fox et al.
2014/0040238 A1 2/2014 Scott et al.
2014/0075414 A1 3/2014 Fox et al.
2014/0122182 A1 5/2014 Cherusseri et al.
2014/0149894 A1 5/2014 Watanabe et al.
2014/0163959 A1 6/2014 Hebert et al.
2014/0188746 A1 7/2014 Li
2014/0297476 A1 10/2014 Wang et al.
2014/0331200 A1 11/2014 Wadhwani et al.
2014/0337355 A1 11/2014 Heinze
2015/0127567 A1 5/2015 Menon et al.
2015/0220608 A1 8/2015 Crestani Campos et al.
2015/0331866 A1 11/2015 Shen et al.
2016/0253688 A1 9/2016 Nielsen et al.
2016/0350105 A1 12/2016 Kumar et al.
2016/0378618 A1 12/2016 Cmielowski et al.
2017/0034023 A1 2/2017 Nickolov et al.
2017/0063776 A1 * 3/2017 Nigul ..................... G06N 5/022
2017/0154543 A1 6/2017 King et al.
2017/0220633 A1 8/2017 Porath et al.
2017/0286541 A1 10/2017 Mosley et al.
2017/0286548 A1 10/2017 De et al.
2018/0046609 A1 2/2018 Agarwal et al.
2018/0067836 A1 * 3/2018 Apkon ...................... G06F 8/34
2018/0114000 A1 4/2018 Taylor
2018/0189055 A1 7/2018 Dasgupta et al.
2018/0191599 A1 7/2018 Balasubramanian et al.
2018/0329883 A1 11/2018 Leidner et al.
2018/0349388 A1 12/2018 Skiles et al.
2019/0229998 A1 7/2019 Cattoni
2019/0278933 A1 9/2019 Bendory et al.
2019/0286683 A1 9/2019 Kittur et al.
2019/0294703 A1 9/2019 Bolin et al.
2019/0311044 A1 10/2019 Xu et al.
2019/0324981 A1 10/2019 Counts et al.
2020/0110839 A1 4/2020 Wang et al.
2020/0125482 A1 4/2020 Smith et al.
2020/0133830 A1 4/2020 Sharma et al.
2020/0293354 A1 9/2020 Song et al.
2020/0301672 A1 9/2020 Li et al.
2020/0301908 A1 9/2020 Frost et al.
2020/0348929 A1 11/2020 Sousa et al.
2020/0356363 A1 * 11/2020 Dewitt ...................... G06F 8/75
2021/0049091 A1 * 2/2021 Hikawa ............... G06F 11/3636
2021/0073293 A1 3/2021 Fenton et al.
2021/0081189 A1 3/2021 Nucci et al.
2021/0081418 A1 3/2021 Silveira et al.
2021/0141863 A1 5/2021 Wu et al.
2021/0149658 A1 5/2021 Cannon et al.
2021/0149668 A1 * 5/2021 Gupta ..................... G06F 9/547
2021/0349801 A1 11/2021 Rafey
2021/0357210 A1 11/2021 Clement et al.
2021/0382712 A1 * 12/2021 Richman ................ G06N 20/00
2021/0397418 A1 12/2021 Nikumb et al.
2022/0012297 A1 1/2022 Basu et al.
2022/0083577 A1 * 3/2022 Yoshida .............. G06F 16/3344
2022/0107802 A1 4/2022 Rao et al.
2022/0215068 A1 7/2022 Kittur et al.
2023/0308700 A1 * 9/2023 Perez ................. H04N 21/2541
725/118

FOREIGN PATENT DOCUMENTS

WO WO-2007/013418 A1 2/2007
WO WO-2020/086773 A1 4/2020

OTHER PUBLICATIONS

Khatri et al, "Validation of Patient Headache Care Education System (PHCES) Using a Software Reuse Reference Model", Journal of System Architecture, pp. 157-162 (Year: 2001).
Lotter et al, "Code Reuse in Stack Overflow and Popular Open Source Java Projects", IEEE, pp. 141-150 (Year: 2018).
Rothenberger et al, "Strategies for Software Reuse: A Principal Component Analysis of Reuse Practices", IEEE, pp. 825-837 (Year:2003).

(56) References Cited

OTHER PUBLICATIONS

Tung et al, "A Framework of Code Reuse in Open Source Software", ACM, pp. 1-6 (Year: 2014).
Lampropoulos et al, "REACT—A Process for Improving Open-Source Software Reuse", IEEE, pp. 251-254 (Year: 2018).
Leclair et al., "A Neural Model for Generating Natural Language Summaries of Program Subroutines," Collin McMillan, Dept. of Computer Science and Engineering, University of Notre Dame Notre Dame, IN, USA, Feb. 5, 2019.
Schweik et al, Proceedings of the OSS 2011 Doctoral Consortium, Oct. 5, 2011, Salvador, Brazil, pp. 1-100, Http:/Avorks.bepress.com/charles_schweik/20 (Year: 2011).
Stanciulescu et al., "Forked and Integrated Variants in an Open-Source Firmware Project", IEEE, pp. 151-160 (Year: 2015).
Zaimi et al, ":An Empirical Study on the Reuse of Third-Party Libraries in Open-Source Software Development", ACM, pp. 1-8 (Year: 2015).
M. Squire, "Should We Move to Stack Overflow? Measuring the Utility of Social Media for Developer Support," 2015 IEEE/ACM 37th IEEE International Conference on Software Engineering, Florence, Italy, 2015, pp. 219-228, doi: 10.1109/ICSE.2015.150. (Year: 2015).
S. Bayati, D. Parson, T. Sujsnjak and M. Heidary, "Big data analytics on large-scale socio-technical software engineering archives," 2015 3rd International Conference on Information and Communication Technology (ICoICT), Nusa Dua, Bali, Indonesia, 2015, pp. 65-69, doi: 10.1109/ICoICT.2015.7231398. (Year: 2015).
Andreas DAutovic, "Automatic Assessment of Software Documentation Quality", published by IEEE, ASE 2011, Lawrence, KS,USA, pp. 665-669, (Year: 2011).

* cited by examiner

Figure 8:
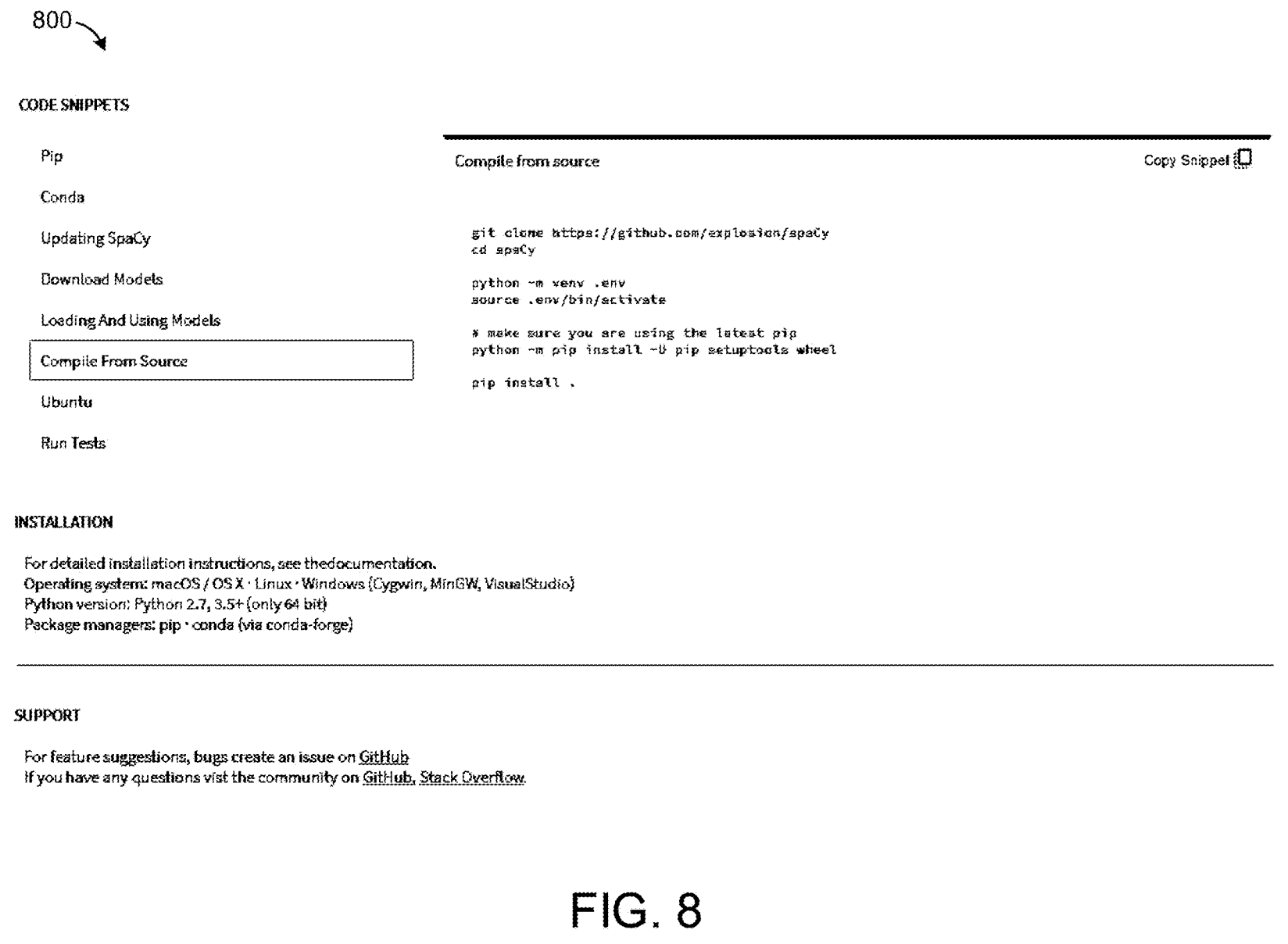

800

CODE SNIPPETS

- Pip
- Conda
- Updating SpaCy
- Download Models
- Loading And Using Models
- Compile From Source
- Ubuntu
- Run Tests Compile from source Copy Snippet

```
git clone https://github.com/explosion/spaCy
cd spaCy

python -m venv .env
source .env/bin/activate

# make sure you are using the latest pip
python -m pip install -U pip setuptools wheel

pip install .
```

INSTALLATION

For detailed installation instructions, see thedocumentation.
Operating system: macOS / OS X · Linux · Windows (Cygwin, MinGW, VisualStudio)
Python version: Python 2.7, 3.5+ (only 64 bit)
Package managers: pip · conda (via conda-forge)

SUPPORT

For feature suggestions, bugs create an issue on GitHub
If you have any questions vist the community on GitHub, Stack Overflow.

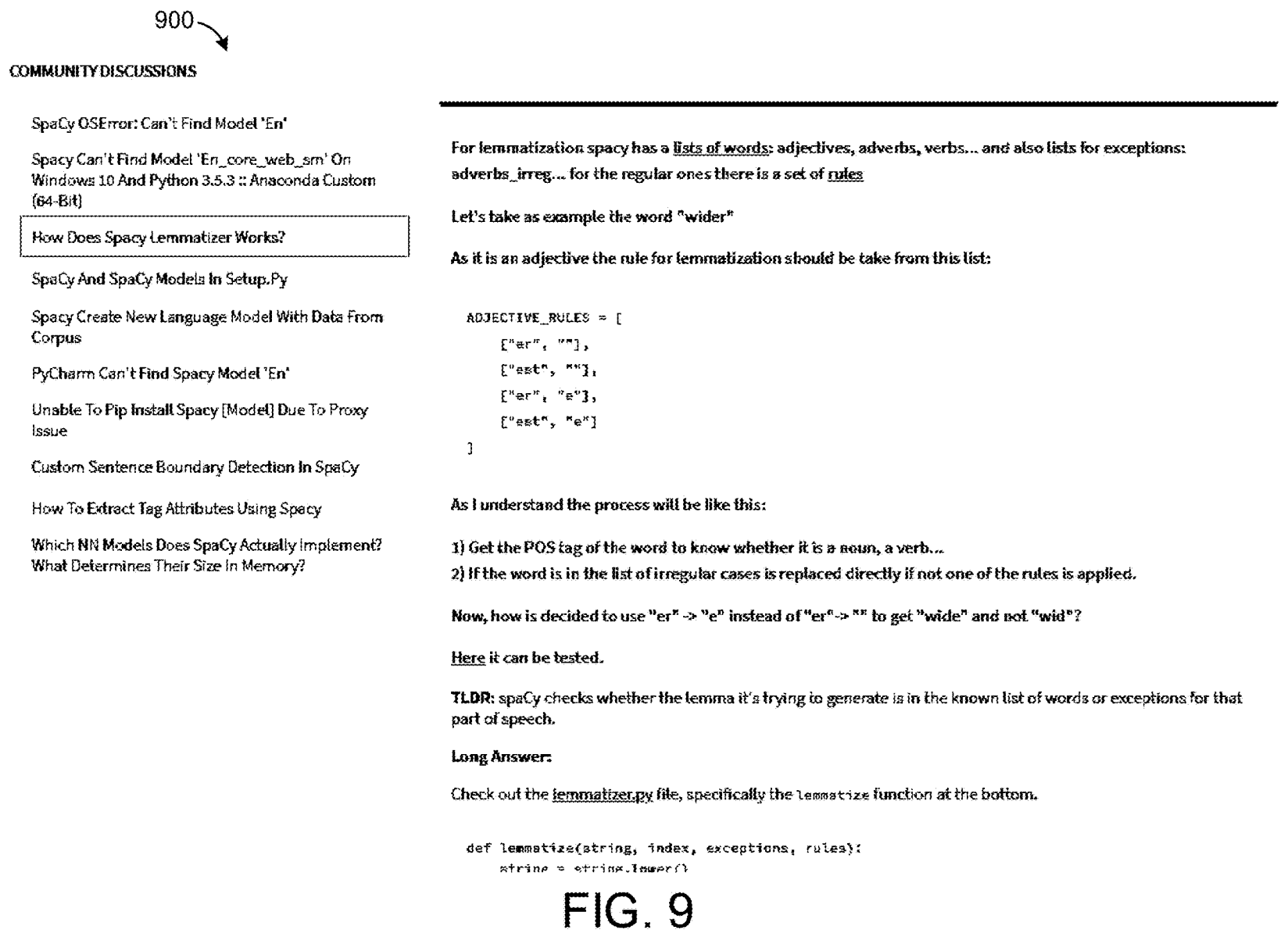

COMMUNITY DISCUSSIONS

SpaCy OSError: Can't Find Model 'En'

Spacy Can't Find Model 'En_core_web_sm' On Windows 10 And Python 3.5.3 :: Anaconda Custom (64-Bit)

How Does Spacy Lemmatizer Works?

SpaCy And SpaCy Models In Setup.Py

Spacy Create New Language Model With Data From Corpus

PyCharm Can't Find Spacy Model 'En'

Unable To Pip Install Spacy [Model] Due To Proxy Issue

Custom Sentence Boundary Detection In SpaCy

How To Extract Tag Attributes Using Spacy

Which NN Models Does SpaCy Actually Implement? What Determines Their Size In Memory?

For lemmatization spacy has a lists of words: adjectives, adverbs, verbs... and also lists for exceptions: adverbs_irreg... for the regular ones there is a set of rules

Let's take as example the word "wider"

As it is an adjective the rule for lemmatization should be take from this list:

```
ADJECTIVE_RULES = [
    ["er", ""],
    ["est", ""],
    ["er", "e"],
    ["est", "e"]
]
```

As I understand the process will be like this:

1) Get the POS tag of the word to know whether it is a noun, a verb...
2) If the word is in the list of irregular cases is replaced directly if not one of the rules is applied.

Now, how is decided to use "er" -> "e" instead of "er"-> "" to get "wide" and not "wid"?

Here it can be tested.

TLDR: spaCy checks whether the lemma it's trying to generate is in the known list of words or exceptions for that part of speech.

Long Answer:

Check out the lemmatizer.py file, specifically the `lemmatize` function at the bottom.

```
def lemmatize(string, index, exceptions, rules):
    string = string.lower()
```

FIG. 9

METHODS AND SYSTEMS FOR AUTO CREATION OF SOFTWARE COMPONENT REFERENCE GUIDE FROM MULTIPLE INFORMATION SOURCES

CROSS-REFERENCE TO RELATED PATENT APPLICATION

This application claims the benefit of and priority to U.S. Provisional Patent Application No. 63/153,241 filed Feb. 24, 2021, the entire disclosure of which is incorporated by reference herein.

TECHNICAL FIELD

The present disclosure generally relates to methods and systems for helping developers implement software components easier through providing an auto generated software component reference guide.

BACKGROUND

There are over 40 million software components available in the public domain. They are changing every minute with new components being added and existing components being updated. Components also belong to different categories of source code, packages, cloud-based APIs and other forms of libraries.

Given this volume and complexity it is very difficult for developers to review how to use the software component and implement them effectively. It takes considerable time to understand information about the software component from multiple sources and also takes up multiple trial and error efforts to make the software component work.

Integrating the wrong software component into applications could also lead to performance degradation, business downtime and security risks.

When considering some of the systems and methods in the prior art, the above discussed drawbacks are evident. For example, U.S. Pat. No. 8,627,270B2 discloses a computer system comprising a transceiver; and a processor configured to facilitate collecting and storing information related to a software project having one or more software artifacts. The information including: a project identifier, artifact identifiers for the artifacts used by the project, information about the temporal version for the artifacts, and contact information for a project user; collecting, from a repository, artifact metadata associated with the software artifacts. The artifact metadata including: information identifying the artifact, information about security risks associated with the artifact, information about a license associated with the artifact, or information indicative of a level of use or user rating of the artifact; periodically monitoring the metadata to determine whether there has been any actionable change in the artifact metadata; and notifying the project user using the contact information if it is determined that there has been an actionable change in the artifact metadata. This disclosure describes monitoring an artifact over a period of time and informing users if there is any noticeable change or threat with the artifact but is silent about software component reference guide and natural language processing.

U.S. Pat. No. 9,043,753B2 discloses a method for recommending at least one artifact to an artifact user is described. The method includes obtaining user characteristic information reflecting preferences, particular to the artifact user, as to a desired artifact. The method also includes obtaining first metadata about each of one or more candidate artifacts, and scoring, as one or more scored artifacts, each of the one or more candidate artifacts by evaluating one or more criteria, not particular to the artifact user, applied to the first metadata. The method further includes scaling, as one or more scaled artifacts, a score of each of the one or more scored artifacts, by evaluating the suitability of each of the one or more scored artifacts in view of the user characteristic information. The method lastly includes recommending to the artifact user at least one artifact from among the one or more scaled artifacts based on its scaled score. This disclosure describes recommending at least one artifact to artifact user by trying to match user characteristic information with the artifacts but is silent about software component reference guide, frequently asked questions and their related solutions, and natural language processing.

U.S. Patent Application Publication No. 2006/0200741A1 discloses a model development system provides tools for developers to define reusable, object-oriented components and views for collecting and displaying data from multiple sources, and for incorporating such reusable components and views into an informational model. Using the system, a developer can create a reusable component, create multiple instances of that component, and connect each such instance to one or more corresponding back-end data sources. The developer can also define one or more associated views that specify how data collected by the component from the back-end data sources is to be displayed. Many different components and views may be defined and deployed to build an informational model of a business entity, such as a business that operates processing or manufacturing plants in various locations. This disclosure describes tools for developers to define reusable, object-oriented components and views for collecting and displaying data from multiple sources, and for incorporating such reusable components and views into an informational model, but is silent on software component reference guide, frequently asked questions and their related solutions, and natural language processing.

In view of the above, there is a need for a method and system for helping developers implement software components easier through providing an automatically generated software component reference guide.

SUMMARY

The following presents a simplified summary of the subject matter in order to provide a basic understanding of some of the aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

A system and a method executed using the system for auto creation of software component reference guide from multiple information sources is disclosed here. At least one processor is provided that operates under control of a stored program comprising a sequence of program instructions to control one or more components. The components comprise a Web GUI portal, a Software Component Identifier, a Source and Information Classifier, a Component Guide Generator, an Introduction Generation Service, a Technology Guide Service, a Frequently Asked Questions (FAQ) Service, a Software Guide Natural Language Generator, and a Software Information Crawler. The Web GUI portal is used by a user or an external system to submit a software component and view corresponding results. The Software Component Identifier is in communication with the Web GUI portal to identify the software component uniquely. The Source and Information Classifier is in communication with the Software Component Identifier to identify different sources of information regarding the software component.

The Component Guide Generator is in communication with the Source and Information Classifier to anchor generation of the information regarding the software component. The Introduction Generation Service is in communication with the Component Guide Generator to generate introductory information of the software component. The Technology Guide Service is in communication with the Component Guide Generator to generate technology details of the software component. The FAQ Generation Service is in communication with the Component Guide Generator to generate Frequently Asked Questions and their related solutions based on the software component. The Software Guide Natural Language Generator is in communication with the Introduction Generation Service, the Technology Guide Service, and the FAQ Generation Service, to train a catalog of natural language terms related to the software component. The Software Information Crawler process different software component details based on the trained catalog.

In an embodiment, the Web GUI portal is configured to accept request to generate the component reference guide of the software components, accept descriptors of each software component with qualifiers indicating source if desired by the user, accept user preferences and context of implementation of the software component. In an embodiment, the Software Component Identifier is configured to identify the software component requested by the user and uses machine learning techniques to shortlist the source of the software component based on the user preferences and context, if the source is present across multiple providers.

In an embodiment, the Source and Information Classifier is configured to identify the different sources of information based on type of the software component for different ratings comprising Q&A sites, product review sites, public code repositories comprising GitHub, GitLab, BitBucket, SourceForge, Cloud, API providers comprising Microsoft Azure, Amazon Web Services, Google Compute Platform, RapidAPI, software package managers comprising NPM and PyPi, public websites comprising the product details page of the software component provider, and Wikipedia. In an embodiment, the Component Guide Generator is configured to anchor the software component information generation and tabulation process. In an embodiment, the Component Guide Generator is also configured to use machine learning and natural language generation techniques to provide a context match of the software component and the user or system provided context comprising one of installing and using as a service and using one of a source code and an activity comprising animation in a specific technology, which helps the user understand the software component, wherein the Component Guide Generator calls the introduction generation service, the technology guide service, and the FAQ generation service to generate reference details required. The Component Guide Generator is also configured to generate the software component reference guide page after the information is received.

In an embodiment, the Introduction Generation Service is configured to use the machine learning and natural language generation techniques to generate the introductory information of the software component. In an embodiment, the Introduction Generation Service is also configured to generate information regarding comprising component name, author, home page of the component provider, link to the repository, quality information, security information, support information, overview information of the software component and corresponding features that are mined from the sources identified by the Source and Information Classifier.

In an embodiment, the Technology Guide Service is configured to use the machine learning and natural language generation techniques to generate the technology details of the software component. In an embodiment, the Technology Guide Service is also configured to generate information regarding code snippets from the user guide, readme, installation guides from Q&A sites and product support sites and installation information for the software component and support information related to the software component and the software component provider, which are mined from the sources identified by the Source and Information Classifier.

In an embodiment, the FAQ Generation Service is configured to use machine learning and natural language generation techniques to generate the frequently asked questions and their related solutions. In an embodiment, the FAQ Generation Service is configured to generate information regarding most frequently asked questions on the software component, associated most favored solutions that are present in Q&A sites as well as the frequently asked questions present across different product documentation like user guide, installation guides and product website, that are mined from the sources identified by the Source and Information Classifier. In an embodiment, the Software Guide Natural Language Generator is configured to use machine learning techniques to train a catalog of natural language terms related to software fit, quality, security, overview, FAQs, installation, and support in association with the software component. In an embodiment, the Software Guide Natural Language Generator is configured to provide a lookup service associated with the Software Guide Natural Language Generator to the introduction generation service, the technology guide service, and the FAQ generation service.

In an embodiment, the Software Information Crawler is configured to process different software component details that are available in public comprising Q&A websites, software component review websites, CVE, NVD and other vulnerability information providers, public code repositories comprising GitHub, GitLab, BitBucket, SourceForge, Cloud and API providers comprising Microsoft Azure, Amazon Web Services, Google Compute Platform, RapidAPI, software package managers comprising NPM and PyPi, public websites comprising the product details page of the software component provider and Wikipedia. In an embodiment, the Software Information Crawler is also configured to store the details of different unique URLs of the information resources into a file storage.

An aspect is system for automatically creating software component reference guide from multiple information sources, the system comprising: one or more processors and memory storing instructions that, when executed by the one or more processors, cause the one or more processors to perform operations comprising: receiving a request for reference guides for a software component and view corresponding results; identifying the software component; identifying different sources of information for the software component; generating introductory information of the software component; generating technology details of the software component; generating frequently asked questions and their related solutions associated with the software component; and training a catalog of natural language terms related to the software components; and providing, based on the trained catalog, the introductory information, technology details, and FAQs to the user.

In some embodiments, the operations further comprise receiving descriptors of each software component with qualifiers indicating source if desired by the user; receiving user preferences and context of implementation of the software component; and communicating with an external system instead of a user.

In some embodiments, the operations further comprise identifying the software component requested by the user; and providing, based on results of a machine learning model, a list including the source of the software component based on the user preferences and context, if the source is present across multiple providers.

In some embodiments, the operations further comprise identifying the different sources of information based on type of the software component for different ratings comprising one or more of Q&A sites, product review sites, public code repositories comprising GitHub, GitLab, BitBucket, SourceForge, Cloud, API providers comprising Microsoft Azure, Amazon Web Services, Google Compute Platform, RapidAPI, software package managers comprising NPM and PyPi, public websites comprising the product details page of the software component provider, or Wikipedia.

In some embodiments, the operations further comprise anchoring the software component information generation and tabulation process; providing, based on results of a machine learning model and natural language processing, a context match of the software component and the user or system provided context comprising one of installing and using as a service and using one of a source code and an activity comprising animation in a specific technology; and generating the software component reference guide page after the information is received.

In some embodiments, the operations further comprise generating, based on results of a machine learning model and natural language processing, the introductory information of the software component; and generating information regarding comprising component name, author, home page of the component provider, link to the repository, quality information, security information, support information, overview information of the software component and corresponding features that are mined from the identified sources.

In some embodiments, the operations further comprise generating, based on results of a machine learning model and natural language processing, the technology details of the software component; and generating information regarding code snippets from the user guide, readme, installation guides from Q&A sites and product support sites and installation information for the software component and support information related to the software component and the software component provider, which are mined from the identified sources.

In some embodiments, the operations further comprise generating, based on results of a machine learning model and natural language processing, the frequently asked questions and their related solutions; and generating information regarding most frequently asked questions on the software component, associated most favored solutions that are present in Q&A sites as well as the frequently asked questions present across different product documentation including one or more of user guide, installation guides or product website, that are mined from the identified sources identified.

In some embodiments, the operations further comprise training, via a machine learning model, a catalog of natural language terms related to software fit, quality, security, overview, FAQs, installation, and support in association with the software component; and retrieving based on the trained catalog, information to generate introduction, the technology guide, and the FAQ.

In some embodiments, the operations further comprise processing different software component details that are available in public comprising one or more of Q&A websites, software component review websites, CVE, NVD and other vulnerability information providers, public code repositories comprising GitHub, GitLab, BitBucket, SourceForge, Cloud and API providers comprising Microsoft Azure, Amazon Web Services, Google Compute Platform, RapidAPI, software package managers comprising NPM and PyPi, public websites comprising the product details page of the software component provider, or Wikipedia; and storing the details of different unique URLs of the information resources into a file storage.

Another aspect is a method for automatically creating a software component reference guide from multiple information sources, the method comprising: receiving, from a user, a request for reference guides for a software components and view corresponding results; identifying the software component; identifying different sources of information for the software component; generating introductory information of the software component; generating technology details of the software component; generating frequently asked questions (FAQs) and their related solutions associated with the software component; training a catalog of natural language terms related to the software components; and providing, based on the trained catalog, the introductory information, technology details, and FAQs to the user.

In some embodiments, the method further comprises receiving descriptors of the software component with qualifiers indicating source if desired by the user, user preferences and context of implementation of the software component.

In some embodiments, the method further comprises identifying the software component requested by the user; and providing a list, based on results of a machine learning model, the source of the software component based on the user preferences and the context, if the source is present across multiple providers.

In some embodiments, the method further comprises identifying the different sources of information based on software component type for the different ratings comprising one or more of Q&A sites, product review sites, public code repositories comprising GitHub, GitLab, BitBucket, SourceForge, Cloud and API providers comprising Microsoft Azure, Amazon Web Services, Google Compute Platform, RapidAPI, software package managers comprising NPM and PyPi, public websites comprising product details page of the software component provider, or Wikipedia.

In some embodiments, the method further comprises anchoring the software component information generation and tabulation process; providing, based on results of a machine learning model and natural language processing, a context match of the software component and the user or system provided context comprising one of installing as a service, using the source code, and an activity comprising Javascript, helping the user understand the software component; generating the introduction, technology guide, and FAQs based on the reference details required; and generating the software component reference guide page.

In some embodiments, the method further comprises generating, based on results of a machine learning model and natural language processing, the introductory information of the software component; and generating information regarding name, author, home page of provider of the software component, link to the repository, quality information, security information, support information, overview information of the software component and associated features that are mined from the identified sources.

In some embodiments, the method further comprises generating, based on results of a machine learning model and natural language processing, the technology details of the software component; and generating information regarding code snippets from the user guide, readme, installation guides from Q&A sites and product support sites, installation information for the software component, support information related to the software component, and the software component provider, that are mined from the identified sources.

In some embodiments, the method further comprises generating, based on results of a machine learning model and natural language processing, the frequently asked questions regarding the software component and their related solutions; and generating information regarding the most frequently asked questions on the software component, most favored solutions that are present in Q&A sites and the frequently asked questions present across different product documentation comprising user guide, installation guides, and product website, which are mined from the identified sources.

In some embodiments, the method further comprises training, via a machine learning model, a catalog of natural language terms related to software fit, quality, security, overview, FAQs, Installation, and Support.

In some embodiments, the method further comprises processing different software component details that are available in public comprising one or more of Q&A websites, software component review websites, CVE, NVD and other vulnerability information providers, public code repositories comprising GitHub, GitLab, BitBucket, SourceForge, Cloud and API providers like comprising Microsoft Azure, Amazon Web Services, Google Compute Platform, RapidAPI, software package managers comprising NPM and PyPi, public websites comprising the product details page of the software component provider, or Wikipedia; and storing the details of different unique URLs of the information resources into a file storage.

Another aspect is a computer program product for automatically creating software component reference guide from multiple information sources, comprising a processor and memory storing instructions thereon, wherein the instructions when executed by the processor causes the processor to: receive, from a user, a request for reference guides for a software components and view corresponding results; identify the software component; identify different sources of information for the software component; generate introductory information of the software component; generate technology details of the software component; generate frequently asked questions (FAQs) and their related solutions associated with the software component; train a catalog of natural language terms related to the software components; and provide, based on the trained catalog, the introductory information, technology details, and FAQs to the user

BRIEF DESCRIPTION OF THE DRAWINGS

The following drawings are illustrative of particular examples for enabling systems and methods of the present disclosure, are descriptive of some of the methods and mechanism, and are not intended to limit the scope of the disclosure. The drawings are not to scale (unless so stated) and are intended for use in conjunction with the explanations in the following detailed description.

FIG. 8 shows a visual representation of the technology guide section of auto creation of software component reference guide from multiple information sources, in accordance with some embodiments.

FIG. 9 shows a visual representation of the FAQ section of auto creation of software component reference guide from multiple information sources, in accordance with some embodiments.

Figure 1:
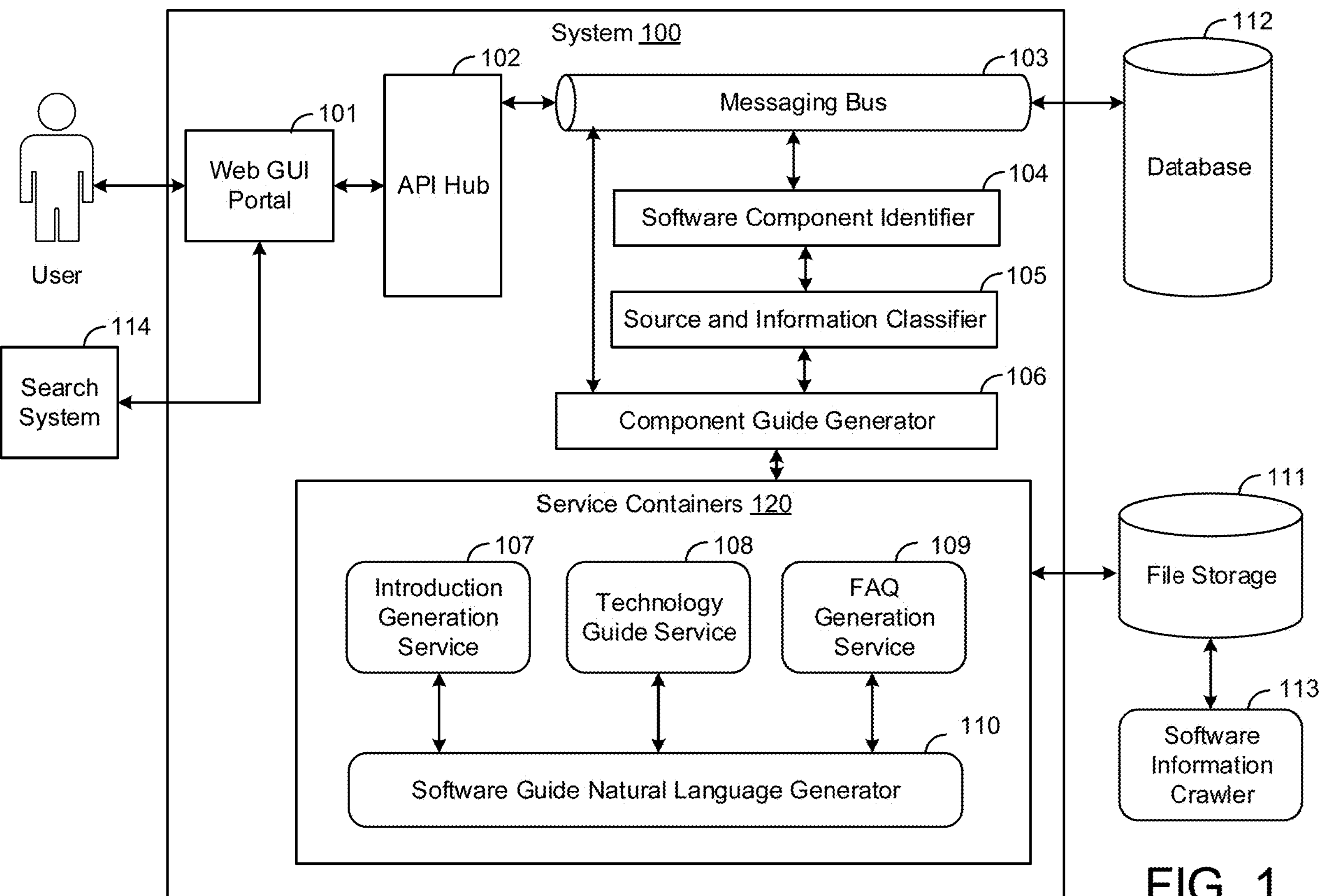
FIG. 1 shows a system architecture that performs auto creation of software component reference guide from multiple information sources, in accordance with some embodiments.

Persons skilled in the art will appreciate that elements in the figures are illustrated for simplicity and clarity and may represent both hardware and software components of the system. Further, the dimensions of some of the elements in the figure may be exaggerated relative to other elements to help to improve understanding of various exemplary embodiments of the present disclosure. Throughout the drawings, it should be noted that like reference numbers are used to depict the same or similar elements, features, and structures.

DETAILED DESCRIPTION

Exemplary embodiments now will be described. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

To solve this issue of selecting the right software component, the disclosure provides a way to generate a software component guide that provides complete documentation of the software component across multiple sources.

This enables the developer to understand the software better, learn from other developers' experience and implement the software faster. This brings in time savings, improved productivity and eliminates business downtime and security risks in implementing unreviewed software components.

FIG. 1 shows a system 100 or a high-level architecture that auto creation of software component reference guide from multiple information sources, in accordance with some embodiments. Briefly, and as described in further detail below, the system 100 discloses a Web GUI Portal 101, API Hub 102, Messaging Bus 103, Software Component Identifier 104, Source and Information Classifier 105, and Component Guide Generator 106. The system 100 includes Service Containers 120 which include Summary Generation Service 107, Installation Generation Service 108, FAQ Generation Service 109, and Software Guide Natural Language Generator 110. The system 100 further includes File Storage 111, Database 112, and Software Information Crawler 113, which are a unique set of components to perform the task of auto creation of software component reference guide from multiple information sources given the software component.

In the embodiment shown in FIG. 1, comprises of the Web GUI Portal 101 which has a user interface form for a user to interface with the system for submitting different requests and viewing their status. The Web GUI Portal 101 allows the user to submit requests for generating software component guides of software components along with their preferences and context of information request and viewing the generated results. For submitting a new request, user is presented with a form to provide the software component names and descriptors that they would like to have more details on. Alternatively, where automation is required, the Web GUI Portal 101 also interacts with an external system (e.g., Search System 114) to provide the same information that the user would have been provided. In other words, the Web GUI Portal 101 exposes API that can be accessed by an external system instead of user.

The submitted request from web portal goes to the API Hub 102 which acts as a gateway for accepting and transmitting all web service requests from the portal. The API Hub 102 hosts the web services for taking the requests and creating request messages to be put into the Messaging Bus 103. The Messaging Bus 103 provides for event driven architecture thereby enabling long running processes to be decoupled from requesting system's calls. This decoupling will help the system to service the request and notify user once the entire process of generating details of the software component is completed. There are job listeners configured to listen to the messages in the messaging bus 103.

The Software Component Identifier 104 in communication with the Web GUI Portal 101 uniquely identifies the software component requested by the user and uses machine learning techniques to shortlist the source of the software component based on the user preferences and context, if the source is present across multiple providers.

The Source and Information Classifier 105 in communication with the Software Component Identifier 104 identifies the different sources of information based on the component type for the different information sections such as Q&A sites, product review sites, public code repositories like, but not limiting to, GitHub, GitLab, BitBucket, SourceForge, Cloud and API providers like, but not limiting to, Microsoft Azure, Amazon Web Services, Google Compute Platform, RapidAPI, software package managers like, but not limiting to, NPM, PyPi etc., public websites like, but not limiting to, the product details page of the software component provider, Wikipedia etc.

The Component Guide Generator 106 in communication with the Source and Information Classifier 105 anchors (or begins or defines or provides parameters for) the component information generation and tabulation process. The Component Guide Generator 106 uses machine learning and natural language generation techniques to provide a context match of the software component and the user or system provided context such as but not limited to installing or using as a service or using the source code or an activity such as animation in a specific technology like Javascript. This helps the user understand the software component. Further, the Component Guide Generator 106 calls Introduction Generation Service 107, Technology Guide Service 108, FAQ Generation Service 109 to generate the reference details required. Once the information is received it generates the software component reference guide page.

The Introduction Generation Service 107 in communication with the Component Guide Generator 106 uses machine learning and natural language generation techniques to generate the introductory information of the software component. The Introduction Generation Service 107 generates information regarding, but not limited to component name, author, home page of the component provider, link to the repository, quality information, security information, support information, overview information of the software component and its features that are mined from the sources identified by the Source and Information Classifier 105.

The Technology Guide Service 108 in communication with the Component Guide Generator 106 uses machine learning and natural language generation techniques to generate the technology details of the software component. The Technology Guide Service 108 generates information regarding, but not limited to code snippets from the user guide, readme, installation guides as well as from Q&A sites and product support sites and installation information for the software component and support information related to the software component and the software component provider, that are mined from the sources identified by the Source and Information Classifier 105.

The FAQ Generation Service 109 in communication with the Component Guide Generator 106 uses machine learning and natural language generation techniques to generate the Frequently Asked Questions and their related solutions. The FAQ Generation Service 109 generates information regarding, but not limited to the most frequently asked questions on the software component, its most favored solutions that are present in Q&A sites as well as the frequently asked questions present across different product documentation like user guide, installation guides and the product website, that are mined from the sources identified by the Source and Information Classifier 105.

The Software Guide Natural Language Generator 110 in communication with the Introduction Generation Service 107, the Technology Guide Service 108, and the FAQ Generation Service 109 uses machine learning techniques to train a catalog of natural language terms related to software fit, quality, support, security, overview, FAQs, Installation, Support. The Software Guide Natural Language Generator 110 provides this lookup service to Introduction Generation Service 107, Technology Guide Service 108, FAQ Generation Service 109.

A File Storage 111 is used to store document type of data, source code files, documents, readme files, installation guides, marketing collateral, user guides, neural network models, etc.

The Database 112 is a relational database management system (RDBS) like MySQL to store all meta-data pertaining to the requests received from the user, external system, messaging bus, request processor and from other system components described above. The meta-data includes details of every request to identify who submitted it, requested details to track the progress as the system processes the request through its different tasks. The status of each execution step in whole process is stored in this database to track and notify the system on completion.

The Software Information Crawler 113 in communication with the Software Guide Natural Language Generator 110 processes different software component details that are available in public like Q&A websites, software component review websites, CVE, NVD and other vulnerability information providers, public code repositories like, but not limiting to, GitHub, GitLab, BitBucket, SourceForge, Cloud and API providers like, but not limiting to, Microsoft Azure, Amazon Web Services, Google Compute Platform, RapidAPI, software package managers like, but not limiting to, NPM, PyPi etc., public websites like, but not limiting to, the product details page of the software component provider, Wikipedia etc. and stores the details of different unique URLs of the information resources into the file storage.

Figure 2:
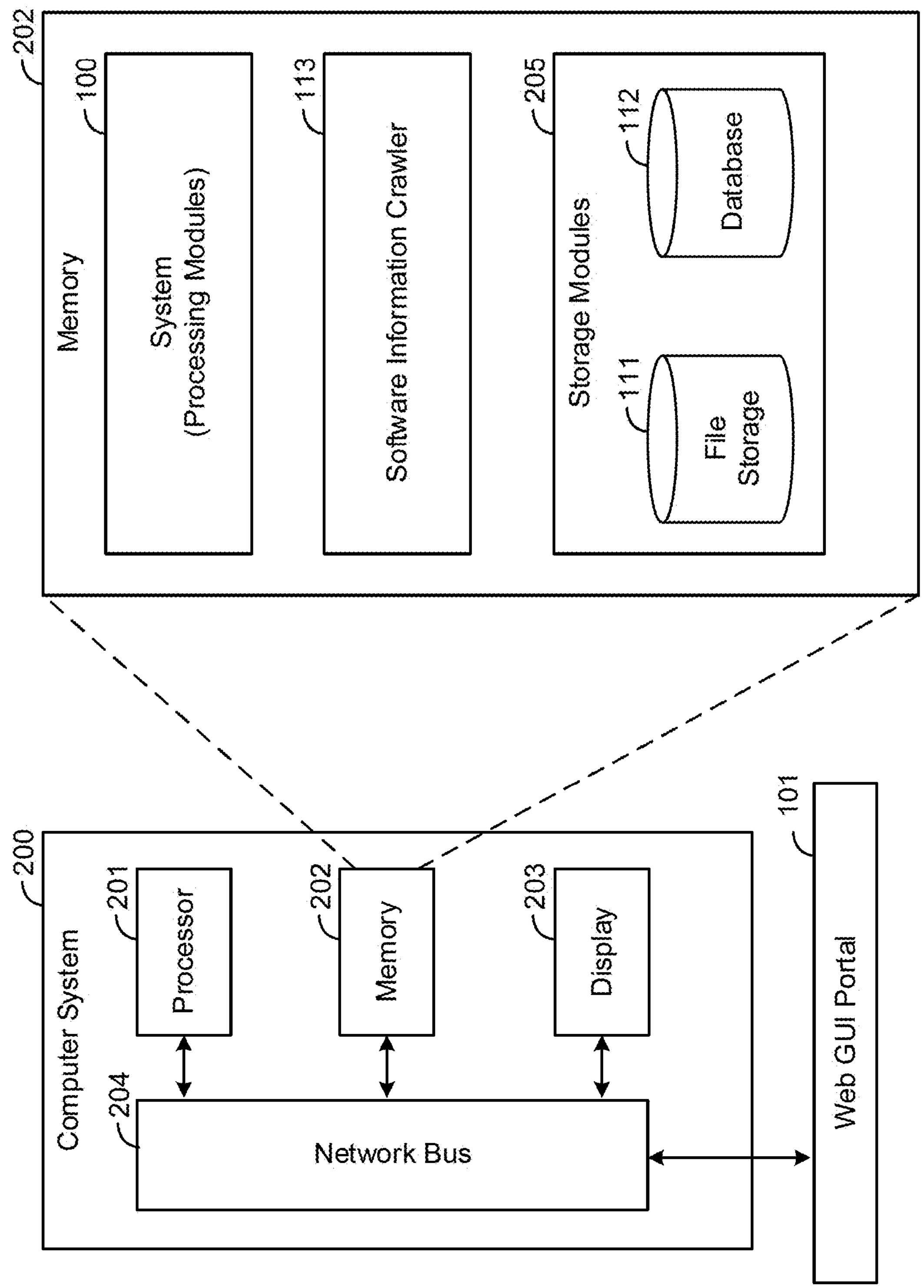
FIG. 2 shows an example computer system implementation for auto creation of software component reference guide from multiple information sources, in accordance with some embodiments.

FIG. 2 shows a block view of the computer system 200 in an embodiment performing auto creation of software component reference guide from multiple information sources, in accordance with some embodiments. This may include a Processor 201, Memory 202, Display 203, Network Bus 204, and other input/output like a microphone, speaker, wireless card etc. The processing modules of system 100, file storage 111, database 112, Software Information Crawler 113, web GUI portal 101 are stored in the memory 202 which provides the necessary machine instructions to the processor 201 to perform the executions for auto creation of software component reference guide from multiple information sources. In some embodiments, the processor 201 controls the overall operation of the system and managing the communication between the components through the network bus 204. The memory 202 holds the auto creation of software component reference guide from multiple information sources system code, data and instructions of the system processing modules 100 and may be of different types of the non-volatile memory and volatile memory.

Figure 3:
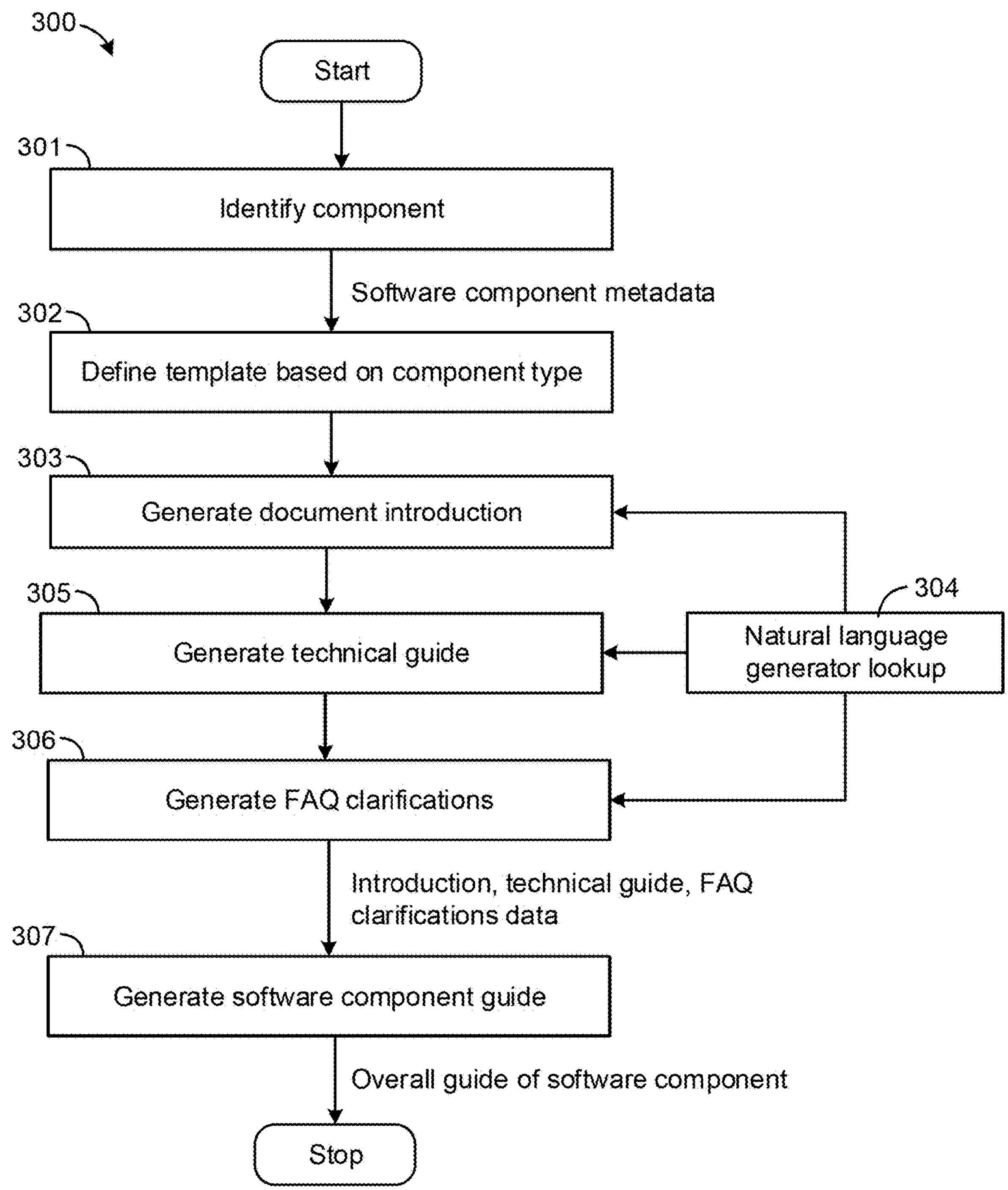
FIG. 3 shows the overall process flow of auto creation of software component reference guide from multiple information sources, in accordance with some embodiments.

FIG. 3 shows a process 300 of auto creation of software component reference guide from multiple information sources, in accordance with some embodiments. In step 301, the software component is identified based on the name and other component details provided by the user. Its information sources are also identified. In step 302, the template for the software component reference guide is decided based on the component type such as but not limited to open-source code, library, package, API, cloud function. In step 303, the introduction content across component name, author, home page of the component provider, link to the repository, link to share the software component details via email, twitter and other social channels of choice, quality information, security information, support information, overview information of the software component and its features is generated. In step 305, the software component technical information across code snippets from the user guide, readme, installation guides as well as from Q&A sites and product support sites and installation information for the software component and support information related to the software component and the software component provider is generated. In step 306, the software component frequently asked questions, its most favored solutions that are present in Q&A sites as well as the frequently asked questions present across different product documentation, for example, user guide, installation guides and the product website is generated. In step 304, a natural language lookup generator trains a catalog of natural language terms related to software fit, quality, support, security, overview, FAQs, installation, support and this training data is used to train a neural network based model which accepts input features and generate natural language text based documentation and provides this lookup service to generate the document introduction (step 303), technical guide (step 305), and FAQ clarifications (step 306). In step 307, the information is assembled into a comprehensive guide using natural language generation techniques and shared with the user.

Based on FIGS. 1-3, a method of auto creation of software component reference guide from multiple information sources is disclosed. At least one processor 201, as shown in FIG. 2, is provided that operates under control of a stored program comprising a sequence of program instructions, as described in the following steps. A first step comprising submitting a set of component details to request reference guides for the software components and view corresponding results. A second step involving identifying the software component uniquely. A third step involving identifying different sources of information for a selected software component. A fourth step including anchoring component information generation associated with the software component. A fifth step involving generating introductory information of the software component. A sixth step involving generating technology details of the software component. A seventh step involving generating frequently asked questions and their related solutions associated with the software component. An eighth step involving training a catalog of natural language terms related to the software components. Finally, a ninth step involving processing different software component details.

Figure 4:
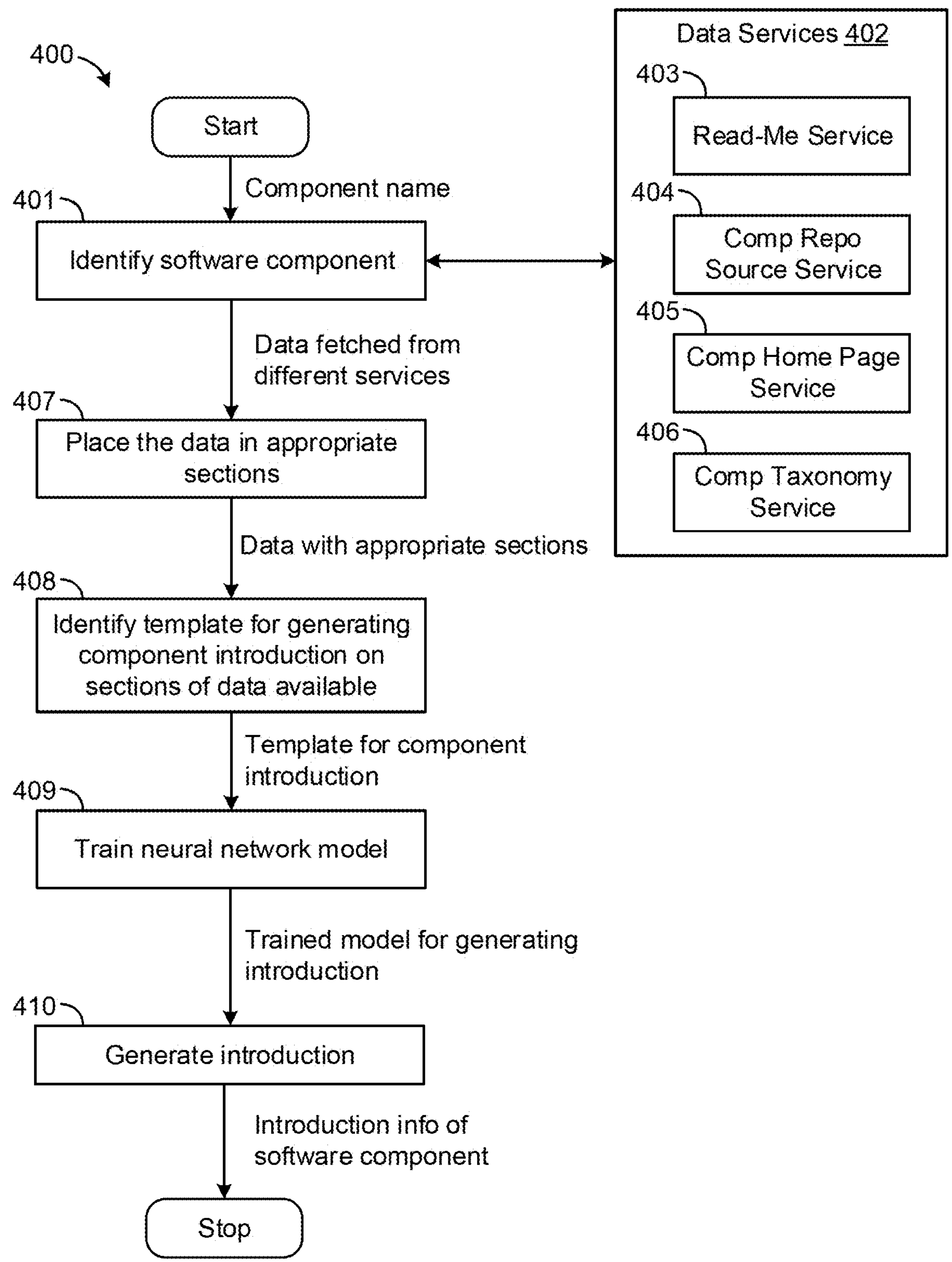
FIG. 4 shows a step-by-step process of generation of introduction for software components from different sources, in accordance with some embodiments.

FIG. 4 shows a process 400 for generation of introduction for software components from different sources, in accordance with some embodiments. The introduction data fetch service receives the component name as an attribute in the input JavaScript Object Notation (JSON) (step 401), and refers Data Services 402 to get the needed input related to the component to generate introduction. A Read-Me Service 403 includes parsed data of Read-Me file gives details such as, overview paragraph and key features of the component. A Comp Repo Source Service 404, that includes data from comp repository like GitHub gives details, such as, component URL, latest version, language, license etc. A Comp Home Page Service 405 includes data by parsing component website gives details, such as, Component Description, Key Features, etc. A Comp Taxonomy Service 406 gives details, such as, Taxonomy name for the component and Taxonomy scores. Placing the data in appropriate sections task helps in placing the data that is received from different data services in appropriate sections (step 407). Identifying template for generating component introduction on the sections of data available task helps in identifying template to be used for generating component introduction (step 408). In step 409, a neural network model is trained and in step 410 the introduction is generated for the component.

Sample output from Read-Me Service 403 to Introduction Generation Service 107:

```
{
        "compId": "explosion/spaCy",
        "overviewParagraph": [{
            "title": "review and ratings",
            "paragraph": "spaCy is a library for advanced Natural Language
Processing in Python and Cython. It's built on the very latest research, and was designed
from day one to be used in real products. spaCy comes with pretrained pipelines and
currently supports tokenization and training for 60+ languages"
        }],
        "compKeyFeaturesList": [
        "Support for 60+ languages",
        "Trained pipelines for different languages and tasks",
        "Multi-task learning with pretrained transformers like BERT"
    ]
}
```

Sample output from Comp Repo Source Service 404 to Introduction Generation Service 107:

```
{
  "compId": "explosion/spaCy",
  "compTitle": " Industrialstrength Natural Language Processing in Python",
  "compUrl": "https://spacy.io",
  "compLatestVersion": "v3.2.1",
  "compLanguage": "Python",
  "compLicense": "MIT",
  "compRepoURL": "https://github.com/explosion/spaCy",
  "repoType": "GitHub",
  "metaDescription": "Implement spaCy with how-to, Q&A, fixes, code snippets. kandi
ratings - Medium support, 8 Bugs, 1001 Code smells, Permissive License, Build
available.",
  }
```

Sample output from Component Home Page Service 405 to Introduction Generation Service 107:

```
{
"compId": "explosion/spaCy",
    "compDesc    ": "spaCy excels at large-scale information extraction tasks. It's
written from the ground up in carefully memory-managed Cython.",
"compKeyFeaturesList": [
            "Support for 60+ languages"
]
}
```

Sample output from Component Taxonomy Service 406 to Introduction Generation Service 107:

```
{
  "compId": "explosion/spaCy",
  "taxonomyName": "Natural Language Processing",
  "taxonomySupportScores": {
    "bestScore": 10.0,
    "averageScore": 7.0,
    "compScore": 10.0
  },
  "taxonomyQualityScores": {
    "bestScore": 10.0,
    "averageScore": 9.754375832963127,
    "compScore": 5.25
  },
  "taxonomySecurityScores": {
    "bestScore": 10.0,
    "averageScore": 9.949769361765142,
    "compScore": 9.5
  }
}
```

Figure 5:
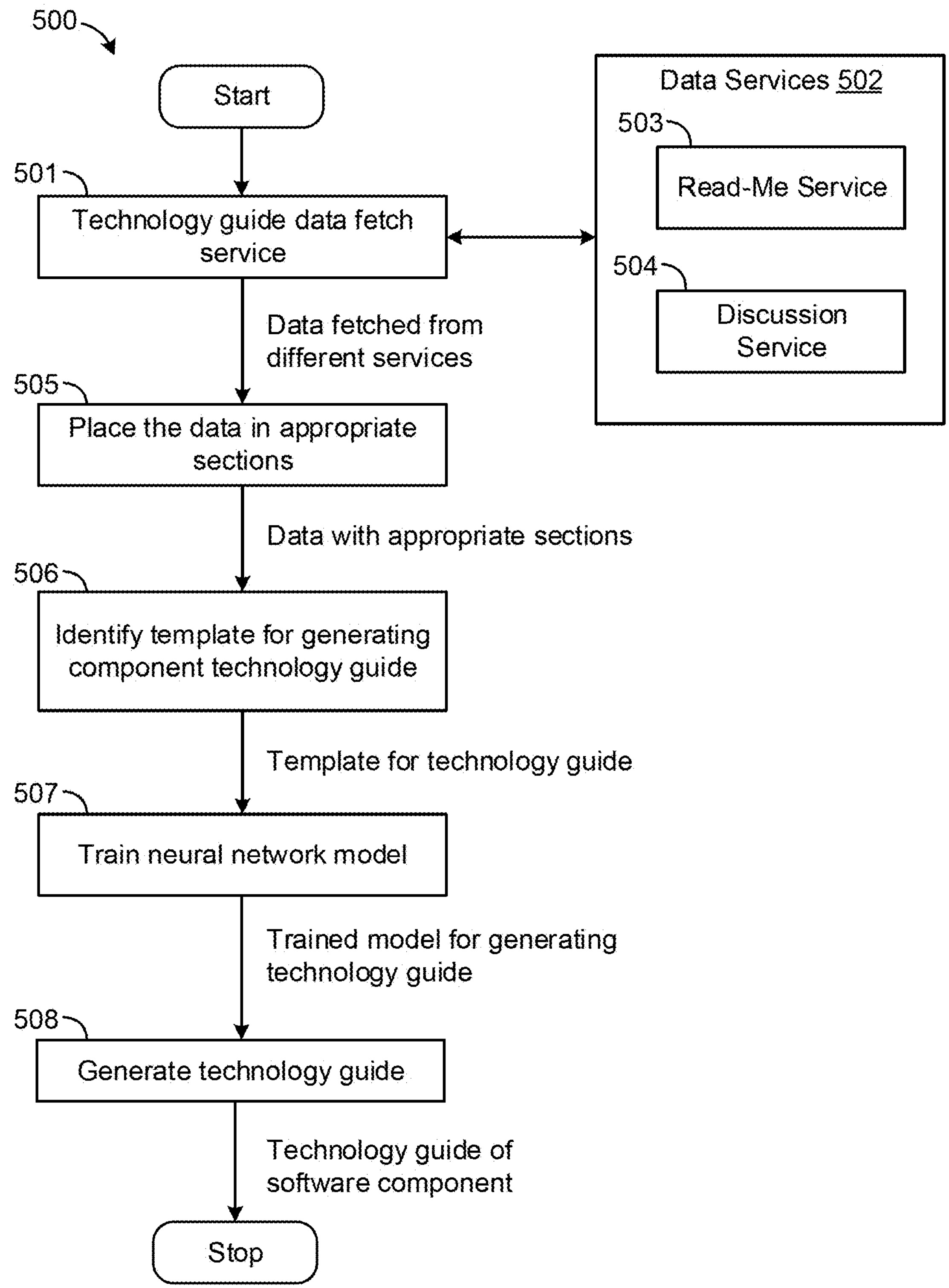
FIG. 5 shows a step-by-step process of generation of technology guide for software components from different sources, in accordance with some embodiments.

FIG. 5 shows a process 500 for generation of a technology guide for software components from different Sources, in accordance with some embodiments. The Technology Guide Data Fetch Service receives the component name as an attribute in the input JSON (step 501), and refers Data Services to get the needed input related to the component to generate technology guide (step 502). A Read-Me Data Service 503 that includes parsed data of Read-Me file gives details, such as, install command and code snippets list. The module Discussions Data Service 504 includes parsed data from different discussion forums like Stack-Overflow gives Code Snippets list. The step of placing the data in appropriate sections helps in placing the data that is received from different data services in appropriate sections (step 505). Identifying Template for generating Component Technology guide helps in identifying template to be used for generating Component Technology guide (step 506). A neural network model is trained (step 507) and the Technology Guide is generated for the component (step 508).

Sample output from Read-Me Service 503 to Technology Guide Service 108:

```
{
  "compId": "explosion/spaCy",
  "compInstallCommmand": "",
```

-continued

```
"codeSnippetsList": [
  {
    "title": "pip",
    "code": "pip install -U pip setuptools wheel\npip install spacy\n",
    "source": "README-PARSER"
  },
  {
    "title": "conda",
    "code": "conda install -c conda-forge spacy\n",
    "source": "README-PARSER"
  }
 ]
}
```

Sample output from Discussions Service 504 to Technology Guide Service 108:

```
{
  "compId": "explosion/spaCy",
  "codeSnippetsList": [
          {
       "title": "SpaCy custom NER training AttributeError: 'DocBin' object has no attribute
'to_disk'",
       "code": "<pre class=\"lang-py prettyprint-override><code>import spacy\nfrom
spacy.tokens import DocBin\n\nnlp = spacy.blank(\"en\") # load a new spacy model\ndb
=DocBin( ) # create a DocBin object\n\n# omitting code for debugging
purposes\n\ndb.to_disk(\"./train.spacy\") # save the docbin object\n</code></pre>",
       "source": "SOF"
     }
  ]
}
```

Figure 6:
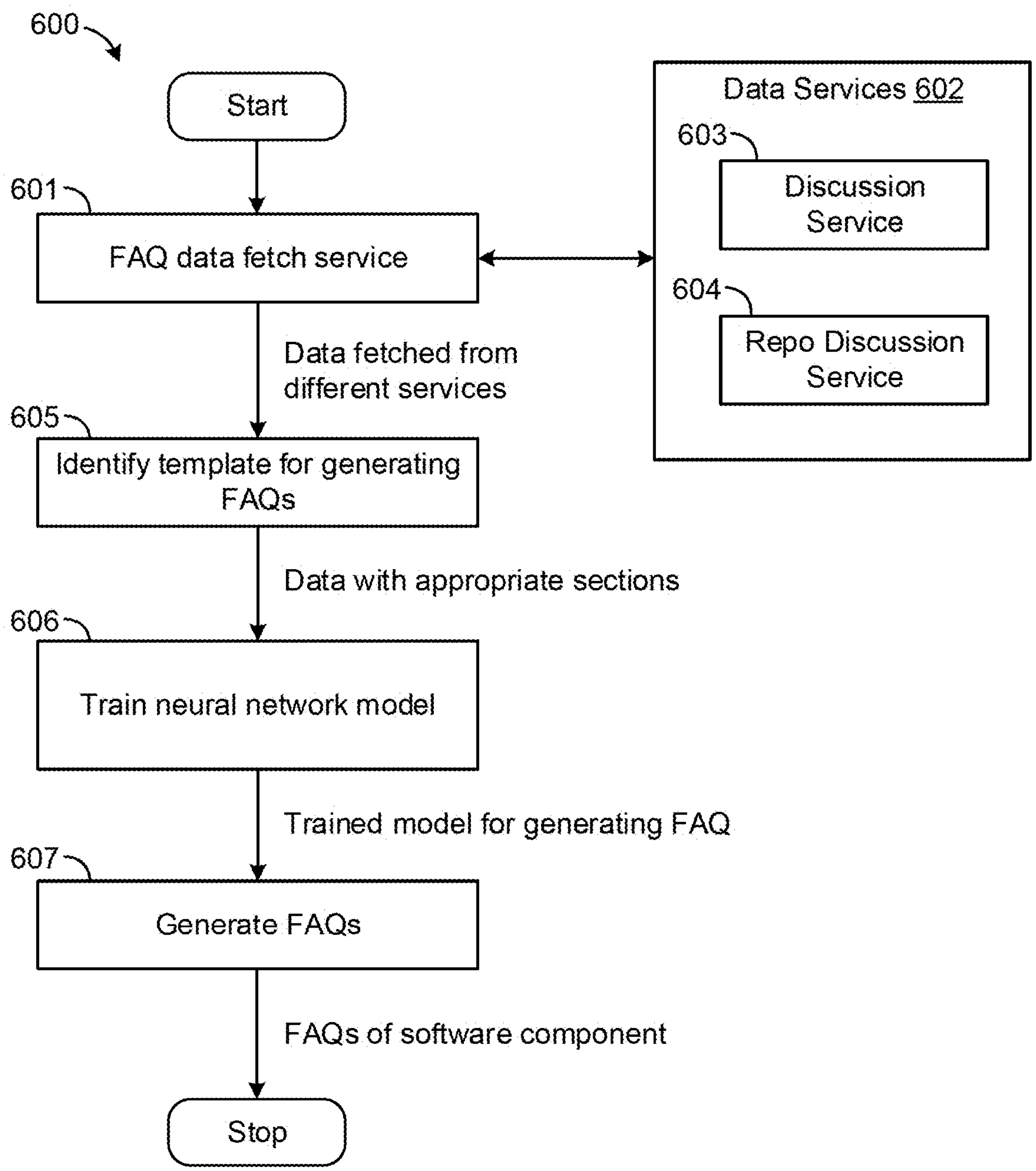
FIG. 6 shows a step-by-step process of generation of FAQs for software components from different sources, in accordance with some embodiments.

FIG. 6 shows a process 600 for Generation of FAQs for software components from different sources, in accordance with some embodiments. The FAQ Data Fetch Service receives the component name as an attribute in the input JSON (step 601) and refers Data Services 602 to get the needed input related to the component to generate FAQs. The Discussions Data Service 603 module, that contains parsed data from different discussion forums like StackOverflow gives Community Discussions list. The Comp Repo Discussion Service 604 module, that contains discussions data from comp repository like GitHub also gives Community Discussions list. Identifying Template for generating FAQs task helps in identifying template to be used for generating FAQ (step 605). The neural network model is trained (step 606) and FAQs are generated for the component (step 607).

Sample output from Discussion Service 603 to FAQ Generation Service 109:

```
{
  "compId": "explosion/spaCy",
  "communityDiscussionsList": [
                  {
                     "title": "Can't import spacy",
                     "fullQuestion": "<p>i've been trying to import
<strong>spacy</strong> but everytime an error appears as a result.\nI used this line to
install the package :</p>\n<pre><code>conda install -c conda-forge
spacy\n</code></pre>\n<p>then i tried to <strong>import spacy</strong> and it gives
me this error:</p>\n<pre><code>------------------------------------------------------------------
--------\nAttributeError            Traceback (most recent call last)\n&lt;python-input-11-
76a01d9c502b&gt; in &lt;module&gt;\n----&gt; 1 import
spacy\n\n~\\Python\\Text\\spacy.py in &lt;module&gt;\n    9 import spacy\n    10 # Load
English tokenizer, tagger, parser, and NER\n---&gt; 11 nlp =
spacy.load('en_core_ web_sm')\n    12 # Process whole documents\n    13 text =
(&quot;When Sebastian Thrun started working on self-driving cars at
&quot;\n\nAttributeError: partially initialized module 'spacy' has no attribute 'load' (most
likely due to a circular import)\n</code></pre>\n<p>Can anybody help me.</p>\n",
                     "answer": "<p>The problem is that the file you are working in is
named <code>spacy.py</code>, which is interfering with the spacy module. So you
should rename your file to something other than &quotspacy&quot;.</p>\n",
                     "link": "https://stackoverflow.com/questions/67890652",
                     "questionUrl": "https://stackoverflow.com/questions/67890652",
                     "activityDate": "2021-06-08T16:11:07",
                     "questionDate": "2021-06-08T16:11:07",
                     "answeredDate": "2021-06-08T16:11:07",
                     "strQuestionDate": "2021-Jun-08 at 16:11",
                     "strAnsweredDate": "2021-Jun-08 at 16:11"
```

-continued

```
                "source": "SOF"
            }
        ]
}
```

Sample output from Repo Discussion Service 604 to FAQ Generation Service 109:

```
{
  "compId": "explosion/spaCy",
  "communityDiscussionsList": [
            {
                "title": "How to add the source of custom trained ner component?",
                "fullQuestion": "<p>Hi, I am trying to create an entity + sentiment
analysis project. I have a custom trained NER component. I need to add the source of this
custom trained NER component into my other spacy pipeline. I tried going through the
documentation but don't understand what exactly should I include in the config file in the
source = ${paths.ner_model} section: <br/> <br/>[components.ner] <br/> factory = "ner"
<br/>source = ${paths.ner_model} <br/> incorrect spans key = null <br/> moves = null
<br/>scorer = {"@scorers":"spacy.ner_scorer.v1"} <br/> update with oracle cut size =
100 <br/> <br/> I have trained and obtained the model_best and model_last, saved in the
specified folder. Do I have to add a custom factory name to my custom NER model in the
config file and add that to my second pipeline?</p>\n",
                "answer": "<p> Hello, <br/> If you haven't renamed the NER
component in your trained model, you can source the component this way: <br/> <br/>
[components.ner] <br/> source =${paths.ner model} <br/> <br/> If you renamed the
NER component then you'll need to add the component variable (not factory) <br/> <br/>
[components.ner] <br/> component = "<component name>" <br/> source =
${paths.ner_model} <br/> <br/> For the ${paths.ner model} variable you have to set the
path to either model-best or model-last directory</p>\n",
                "link": "https://github.com/explosion/spaCy/discussions/10160",
                "questionUrl":
"https://github.com/explosion/spaCy/discussions/10160",
                "source": "REPO-DISCUSSIONS-PARSER"
            }
        ]
}
```

Figure 7:
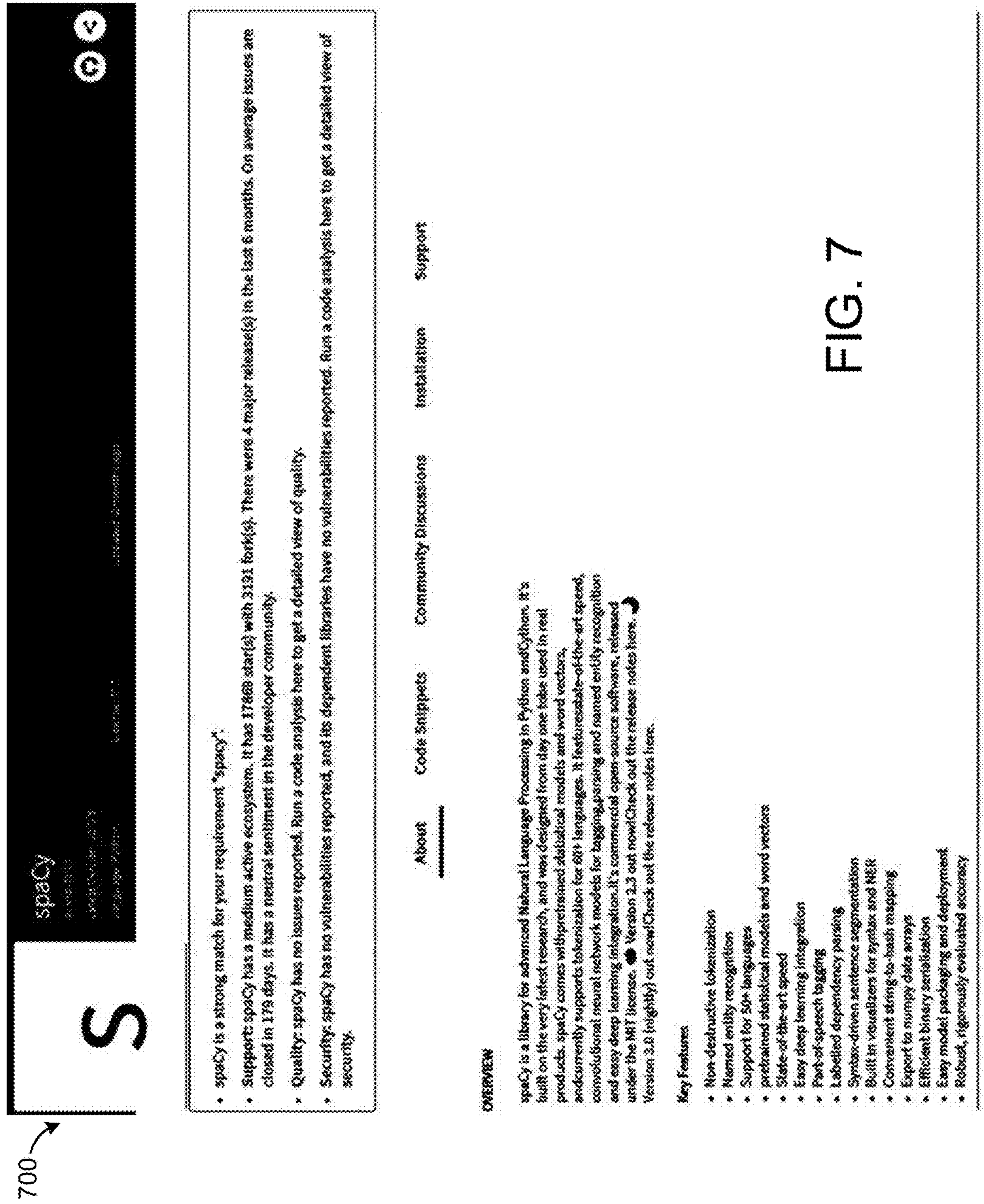
FIG. 7 shows a visual representation of the introduction section of auto creation of software component reference guide from multiple information sources, in accordance with some embodiments.

FIG. 7 shows a visual representation of the introduction section of auto creation 700 of software component reference guide from multiple information sources, in accordance with some embodiments. FIG. 8 shows a visual representation of the technology guide section of auto creation 800 of software component reference guide from multiple information sources, in accordance with some embodiments. FIG. 9 shows a visual representation of the FAQ section of auto creation 900 of software component reference guide from multiple information sources, in accordance with some embodiments.

Figure 10:
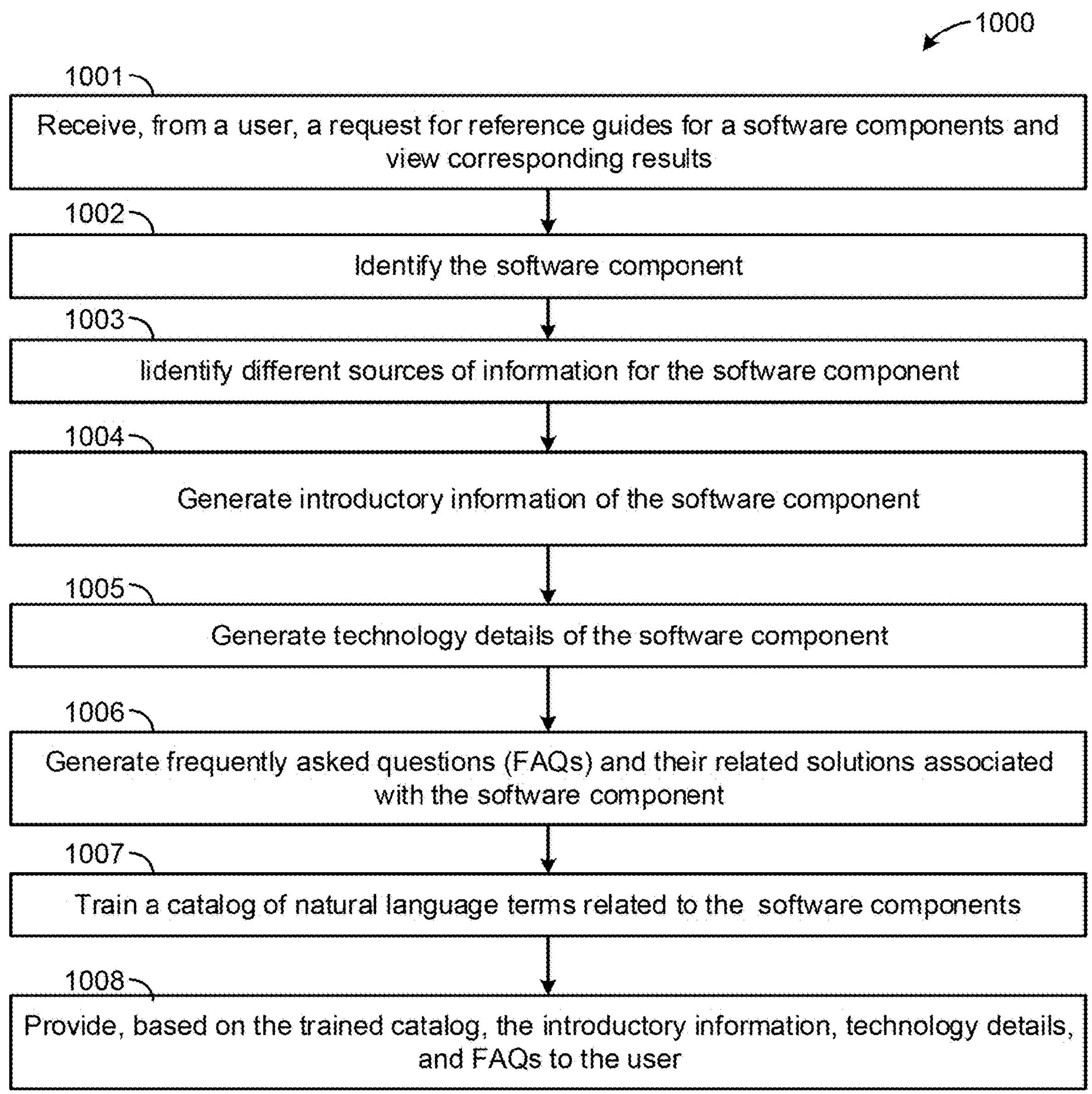
FIG. 10 shows the overall process flow of auto creation of software component reference guide from multiple information sources, in accordance with some embodiments.

FIG. 10 shows a process 1000 that can be performed by a computer program product for automated scoring of ecosystem activity for software projects. Process 1000 can be performed by one or more components of system 100 as previously described. The computer program product for automated software natural language documentation comprises a processor and memory storing instructions. The instructions when executed by the processor causes the processor to perform multiple steps. The processor receives, from a user, a request for reference guides for a software components and view corresponding results (step 1001), identifies the software component (step 1002), identifies different sources of information for the software component (step 1003), generates introductory information of the software component (step 1004), generates technology details of the software component (step 1005), generates frequently asked questions (FAQs) and their related solutions associated with the software component (step 1006), trains a catalog of natural language terms related to the software components (step 1007), and provides, based on the trained catalog, the introductory information, technology details, and FAQs to the user (step 1008).

As will be appreciated by one of skill in the art, the present disclosure may be embodied as a method and system. Accordingly, the present disclosure may take the form of an entirely hardware embodiment, a software embodiment or an embodiment combining software and hardware aspects. It will be understood that the functions of any of the units as described above can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts performed by any of the units as described above.

Instructions may also be stored in a computer-readable memory that can direct a computer or other programmable data processing apparatus to function in a particular manner, such that the instructions stored in the computer-readable memory produce an article of manufacture including instruction means which implement the function/act performed by any of the units as described above.

Instructions may also be loaded onto a computer or other programmable data processing apparatus like a scanner/check scanner to cause a series of operational steps to be performed on the computer or other programmable apparatus to produce a computer implemented process such that the instructions which execute on the computer or other programmable apparatus provide steps for implementing the functions/acts performed by any of the units as described above.

In the specification, there has been disclosed exemplary embodiments of the disclosure. Although specific terms are employed, they are used in a generic and descriptive sense only and not for purposes of limitation of the scope of the disclosure.

What is claimed is:

1. A system for automatically creating a software component reference guide from multiple information sources, the system comprising:

one or more processors and memory storing instructions that, when executed by the one or more processors, cause the one or more processors to perform operations comprising:

training a catalog of natural language terms related to software components and training one or more machine learning models to generate natural language text documentation for the software components;

receiving a request for a reference guide for a first software component;

identifying different sources of information for the first software component;

generating, using the catalog of natural language terms and the one or more machine learning models based on the different sources of information for the first software component, introductory information of the first software component;

generating, using the catalog of natural language terms and the one or more machine learning models based on the different sources of information for the first software component, technology details of the first software component;

generating, using the catalog of natural language terms and the one or more machine learning models based on the different sources of information for the first software component, frequently asked questions (FAQs) and their related solutions associated with the first software component; and providing the software component reference guide by aggregating, the introductory information, the technology details, and the FAQs and using the one or more machine learning models to provide a context match of the first software component and user-specific context information relating to implementation of the first software component; and causing the first software component to be implemented based on the software component reference guide.

2. The system of claim 1, the operations further comprising:

receiving user preferences and the user-specific context information relating to information relating to implementation of the first software component; and communicating with an external system.

3. The system of claim 2, the operations further comprising:

providing, based on results of the one or more machine learning models, a list including a source of the first software component based on the user preferences and the user-specific context information.

4. The system of claim 3, the operations further comprising:

identifying the different sources of information based on type of the first software component, the different sources of information comprising one or more of Q&A sites, product review sites, public code repositories comprising GitHub, GitLab, BitBucket, SourceForge, Cloud, API providers comprising Microsoft Azure, Amazon Web Services, Google Compute Platform, RapidAPI, software package managers comprising NPM and PyPi, public websites comprising a product details page of a software component provider, or Wikipedia.

5. The system of claim 4, the operations further comprising:

anchoring the software component information generation and tabulation process;

wherein the user-specific context information indicates whether the implementation of the first software component corresponds to one of installing the first software component, using the first software component as a service, using source code of the first software component, or an activity comprising animation in a specific technology using the first software component.

6. The system of claim 5, wherein generating the introductory information comprises generating information regarding comprising component name, author, home page of a software component provider, link to a repository, quality information, security information, support information, overview information of the first software component and corresponding features that are mined from the identified different sources of information.

7. The system of claim 5, wherein generating the technology details comprises generating information regarding code snippets from a user guide, readme, installation guides from Q&A sites and product support sites and installation information for the software component and support information related to the software component and the software component provider, which are mined from the identified different sources of information.

8. The system of claim 5, wherein generating the frequently asked questions and their related solutions comprises generating information regarding most frequently asked questions on the first software component, associated most favored solutions that are present in Q&A sites as well as questions present across different product documentation including one or more of user guide, installation guides or product website, that are mined from the identified different sources of information.

9. The system of claim 8, wherein the catalog of natural language terms comprises terms related to software fit, quality, security, overview, FAQs, installation, and support in association with the software component; and wherein the operations further comprise retrieving from the trained catalog, natural language terms for use in the introductory information, the technology details, and the FAQ.

10. The system of claim 9, the operations further comprising:

processing different software component details that are available in public information resources comprising one or more of Q&A websites, software component review websites, CVE, NVD and other vulnerability information providers, public code repositories comprising GitHub, GitLab, BitBucket, SourceForge, Cloud and API providers comprising Microsoft Azure, Amazon Web Services, Google Compute Platform, RapidAPI, software package managers comprising NPM and PyPi, public websites comprising the product details page of the software component provider, or Wikipedia; and storing the different software component details of different unique URLs of the public information resources into a file storage.

11. A method for automatically creating a software component reference guide from multiple information sources, the method comprising:

training a catalog of natural language terms related to software components and training one or more machine learning models to generate natural language text documentation for the software components;

receiving, from a user, a request for a reference guide for a first software component;

identifying different sources of information for the software component;

generating, using the catalog of natural language terms and the one or more machine learning models based on the different sources of information for the software component, introductory information of the first software component;

generating, using the catalog of natural language terms and the one or more machine learning models based on the different sources of information for the software component, technology details of the first software component;

generating, using the catalog of natural language terms and the one or more machine learning models based on the different sources of information for the software component, frequently asked questions (FAQs) and their related solutions associated with the first software component;

providing the software component reference guide by aggregating the introductory information, technology details, and FAQs and using the one or more machine learning models to provide a context match of the software component and user-specific context information relating to implementation of the software component; and causing the first software component to be implemented based on the software component reference guide.

12. The method of claim 11, further comprising:

receiving descriptors of the first software component with qualifiers indicating source if desired by the user, user preferences and the user-specific context information relating to implementation of the software component.

13. The method of claim 12, further comprising:

identifying the first software component based on the request and identifying, based on results of the one or more machine learning models, a source of the software component based on the user preferences and the user-specific context information.

14. The method of claim 13, further comprising identifying the different sources of information based on software component type, the different sources of information comprising one or more of Q&A sites, product review sites, public code repositories comprising GitHub, GitLab, BitBucket, SourceForge, Cloud and API providers comprising Microsoft Azure, Amazon Web Services, Google Compute Platform, RapidAPI, software package managers comprising NPM and PyPi, public websites comprising product details page of the software component provider, or Wikipedia.

15. The method of claim 14, further comprising:

anchoring the software component information generation and tabulation process;

wherein the user-specific context information indicates whether the implementation of the first software component corresponds to one of installing the first software component, using the first software component as a service, using source code of the first software component, or an activity comprising using the first software component with Javascript;

generating the introductory information, the technology details, and the FAQs based on user-required reference details; and generating the software component reference guide page.

16. The method of claim 15, wherein generating the introductory information of the software component comprises generating information regarding name, author, home page of provider of the first software component, link to a repository of the first software component, quality information, security information, support information, overview information of the software component and associated features that are mined from the identified different sources of information.

17. The method of claim 16, wherein generating the technology details comprises generating information regarding code snippets from a user guide, readme, installation guides from Q&A sites and product support sites, installation information for the first software component, support information related to the first software component, and information related to a provider of the first software component.

18. The method of claim 17, wherein generating the frequently asked questions regarding the first software component and their related solutions comprises identifying information regarding most frequently asked questions on the first software component, most favored solutions that are present in Q&A sites and questions present across different product documentation comprising user guide, installation guides, and product website, which are mined from the identified different sources of information.

19. The method of claim 18, wherein the catalog of natural language terms comprises terms related to software fit, quality, security, overview, FAQs, Installation, and Support.

20. The method of claim 19, further comprising:

processing different software component details that are available in public information resources comprising one or more of Q&A websites, software component review websites, CVE, NVD and other vulnerability information providers, public code repositories comprising GitHub, GitLab, BitBucket, SourceForge, Cloud and API providers like comprising Microsoft Azure, Amazon Web Services, Google Compute Platform, RapidAPI, software package managers comprising NPM and PyPi, public websites comprising the product details page of the software component provider, or Wikipedia; and storing the different software component details of different unique URLs of the public information resources into a file storage.

21. A computer program product for automatically creating software component reference guide from multiple information sources, comprising a processor and memory storing instructions thereon, wherein the instructions when executed by the processor causes the processor to:

train a catalog of natural language terms related to software components and train one or more machine learning models to generate natural language text documentation for the software components;

receive, from a user, a request for a reference guide for a first software components;

identify different sources of information for the first software component;

generate, using the catalog of natural language terms and the one or more machine learning models based on the different sources of information for the first software component, introductory information of the first software component;

generate, using the catalog of natural language terms and the one or more machine learning models based on the different sources of information for the first software component, technology details of the first software component;

generate, using the catalog of natural language terms and via natural language generation and the one or more machine learning models the different sources of information for the first software component, frequently asked questions (FAQs) and their related solutions associated with the first software component;

provide the software component reference guide by aggregating, the introductory information, the technology details, and the FAQs and using the one or more machine learning models to provide a context match of the first software component and user-specific context information relating to implementation of the first software component; and causing the first software component to be implemented based on the software component reference guide.

* * * * *